(12) United States Patent
Sato

(10) Patent No.: US 11,105,827 B2
(45) Date of Patent: Aug. 31, 2021

(54) PHYSICAL QUANTITY SENSOR, PHYSICAL QUANTITY SENSOR DEVICE, AND INCLINOMETER, INERTIA MEASUREMENT DEVICE, STRUCTURE MONITORING DEVICE, AND VEHICLE USING PHYSICAL QUANTITY SENSOR DEVICE

(71) Applicant: Seiko Epson Corporation, Tokyo (JP)

(72) Inventor: Kenta Sato, Shiojiri (JP)

(73) Assignee: Seiko Epson Corporation

( * ) Notice: Subject to any disclaimer, the term of this patent is extended or adjusted under 35 U.S.C. 154(b) by 287 days.

(21) Appl. No.: 16/296,386

(22) Filed: Mar. 8, 2019

(65) Prior Publication Data

US 2019/0277876 A1 Sep. 12, 2019

(30) Foreign Application Priority Data

Mar. 9, 2018 (JP) .............................. JP2018-043532

(51) Int. Cl.
*G01P 15/08* (2006.01)
(52) U.S. Cl.
CPC ...... *G01P 15/0802* (2013.01); *G01P 15/0888* (2013.01)
(58) Field of Classification Search
CPC .. G01P 15/0802; G01P 15/0888; G01P 15/18; G01P 15/097; G01P 15/135; G01P 1/023; G01P 21/00; G01P 2015/0871; G01L 1/106; G01L 1/10
See application file for complete search history.

(56) References Cited

U.S. PATENT DOCUMENTS

| | | | | |
|---|---|---|---|---|
| 5,324,688 | A | | 6/1994 | Kondo |
| 5,461,917 | A | * | 10/1995 | Marek ................ G01P 15/0802 73/514.16 |
| 10,677,813 | B2 | * | 6/2020 | Sato ...................... G01P 15/097 |
| 2012/0227274 | A1 | | 9/2012 | Watanabe et al. |
| 2017/0184626 | A1 | | 6/2017 | Kameta |
| 2018/0065840 | A1 | | 3/2018 | Oto |

FOREIGN PATENT DOCUMENTS

| | | | |
|---|---|---|---|
| JP | 2586359 | B2 | 2/1997 |
| JP | 2833257 | B2 | 12/1998 |
| JP | 2000-065856 | A | 3/2000 |
| JP | 2014-085232 | A | 5/2014 |
| JP | 2014-085233 | A | 5/2014 |
| JP | 2014-098565 | A | 5/2014 |
| JP | 2014-119369 | A | 6/2014 |
| JP | 2014-157067 | A | 8/2014 |
| JP | 2014-240762 | A | 12/2014 |
| JP | 2015-099154 | A | 5/2015 |
| JP | 2017-120194 | A | 7/2017 |
| JP | 2018-040658 | A | 3/2018 |

* cited by examiner

*Primary Examiner* — Suman K Nath
(74) *Attorney, Agent, or Firm* — Harness, Dickey & Pierce, P.L.C.

(57) ABSTRACT

A physical quantity sensor includes a base, at least two arms, a movable plate, a hinge, and a physical quantity measurement element. Four quadrants of the sensor are defined by first and second orthogonal lines. The first line passes through the center of the sensor and crosses the hinge. The second line extends along the hinge. Fixed regions of the sensor are located in the first and second quadrants. No fixed regions are located in at least one of the third and fourth quadrants. The third and fourth quadrants are closer to the base than the first and second quadrants in a plan view.

20 Claims, 13 Drawing Sheets

PHYSICAL QUANTITY SENSOR, PHYSICAL QUANTITY SENSOR DEVICE, AND INCLINOMETER, INERTIA MEASUREMENT DEVICE, STRUCTURE MONITORING DEVICE, AND VEHICLE USING PHYSICAL QUANTITY SENSOR DEVICE

The present application is based on, and claims priority from Japanese Application Serial Number 2018-043532, filed Mar. 9, 2018, the disclosure of which is hereby incorporated by reference herein in its entirety.

BACKGROUND

1. Technical Field

The present disclosure relates to a physical quantity sensor, a physical quantity sensor device, and an inclinometer, an inertia measurement device, a structure monitoring device, a vehicle, and the like using the physical quantity sensor device.

2. Related Art

JP-A-2000-65856 is an example of the related art.

In JP-A-2000-65856, an acceleration measurement device which includes a base made of a silicon semiconductor wafer, an upper electrode, and a cantilever interposed between the base and the upper electrode and having a free end that can be bent around a fulcrum portion is described.

However, in the acceleration measurement device described in JP-A-2000-65856, since the outer circumference of the acceleration measurement unit is all fixed, there is a problem that stress distortion due to a difference in thermal expansion coefficients caused by dissimilar materials between a printed circuit board and the acceleration measurement device which occurs when the acceleration measurement device is mounted on the printed circuit board is transmitted to the physical quantity measurement element fixed to a container of a device and a rigid portion through the container.

SUMMARY

An advantage of some aspects of the present disclosure is to solve at least a part of the problems described above, and the present disclosure can be implemented as the following aspects.

(1) An aspect of the present disclosure relates to a physical quantity sensor which includes a base, a movable portion coupled to the base, a first arm portion connected to the base, a second arm portion connected to the base, and a physical quantity measurement element that is attached to the base and the movable portion and measures a physical quantity caused by stress generated in a direction connecting the base and the movable portion, and in which the first arm portion is disposed in a first region on one side in a second direction orthogonal to a first direction connecting the base and the movable portion and is provided with a fixed region which is provided closer to the movable portion side than to the base side, the second arm portion is disposed in a second region on the other side in the second direction orthogonal to the first direction and is provided with a fixed region which is provided in at least one region of the movable portion side and the base side, and a fixed region is not disposed in at least one of a third region positioned on the base side of the first region and a fourth region positioned on the base side of the second region.

(2) In the physical quantity sensor according to the aspect (1) of the present disclosure, the fixed region of the second arm portion may be disposed on the base side.

(3) In the physical quantity sensor according to the aspect (1) of the present disclosure, the fixed region of the second arm portion may be disposed on the movable portion side.

(4) In the physical quantity sensor according to the aspect (3) of the present disclosure, a third arm portion connected to the base may be further included, and the third arm portion may be provided with a fixed region provided in any one of the third region and the fourth region in the third arm portion.

(5) In the physical quantity sensor according to the aspect (1) of the present disclosure, a fourth arm portion connected to the base may be further included, and the fourth arm portion may be provided with a protrusion on a surface opposite to a surface to which the physical quantity measurement element is attached in at least one region where the fixed region is not disposed among the first to fourth regions.

(6) In the physical quantity sensor according to the aspect (1) of the present disclosure, a groove in which an adhesive is filled may be provided in the fixed region.

(7) In the physical quantity sensor according to the aspect (1) of the present disclosure, the base and the movable portion may be coupled through a constricted portion.

(8) Another aspect of the present disclosure relates to a physical quantity sensor device which includes the physical quantity sensor according to the aspect (1) of the present disclosure, and a base on which the physical quantity sensor is mounted, and in which the fixed region is attached to the base.

(9) In the physical quantity sensor device according to the aspect (8) of the present disclosure, a circuit board may be further included, three physical quantity sensors may be provided, and the three physical quantity sensors may be mounted on the circuit board so that each of measurement axes of the three physical quantity sensors is aligned with each of three axes orthogonal to each other.

(10) In the physical quantity sensor device according to the aspect (8) or (9) of the present disclosure, the physical quantity may be acceleration.

(11) Another aspect of the present disclosure relates to an inclinometer which includes the physical quantity sensor device according to (10) and a calculator that calculates an inclination angle of a structure based on an output signal from the physical quantity sensor device attached to the structure.

(12) Another aspect of the present disclosure relates to a structure monitoring device which includes the physical quantity sensor device according to (10), a receiver that receives a measurement signal from the physical quantity sensor device attached to a structure, and a calculator that calculates an inclination angle of the structure based on a signal output from the receiver.

(13) Another aspect of the present disclosure relates to a vehicle which includes the physical quantity sensor device according to (10) and a controller that controls at least one of acceleration, braking, and steering based on a measurement signal detected by the physical quantity sensor device, and in which execution or non-execution of an automatic operation is switched according to a change in a measurement signal from the physical quantity sensor device.

DESCRIPTION OF EXEMPLARY EMBODIMENTS

Hereinafter, preferred embodiments of the present disclosure will be described in detail. The embodiment described below does not unduly limit scope of the present disclosure described in the appended claims, and not all of the configurations described in the embodiment are necessarily indispensable components of the present disclosure.

1. Overview of Physical Quantity Sensor and Physical Quantity Sensor Device

Figure 1:
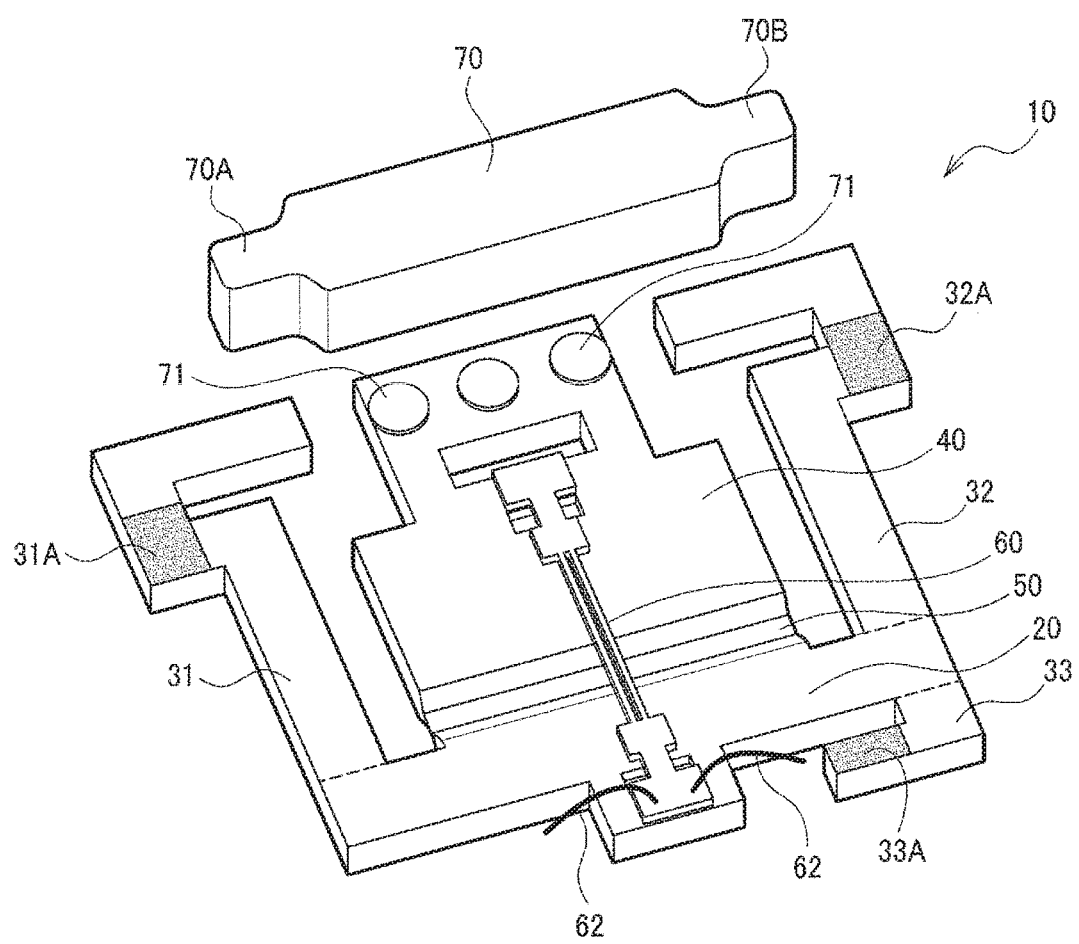
FIG. 1 is a perspective view of a sensor portion of a physical quantity sensor according to an embodiment of the present disclosure.

FIG. 1 illustrates a physical quantity sensor 10. The physical quantity sensor 10 includes a base 20, at least two, for example three arms including a first arm portion 31 (first arm), a second arm portion 32 (second arm), and a third arm portion 33 (third arm), and a movable portion 40 (movable plate), a constricted portion 50 (living hinge), and a physical quantity measurement element 60 (oscillator/sensor).

Figure 2:
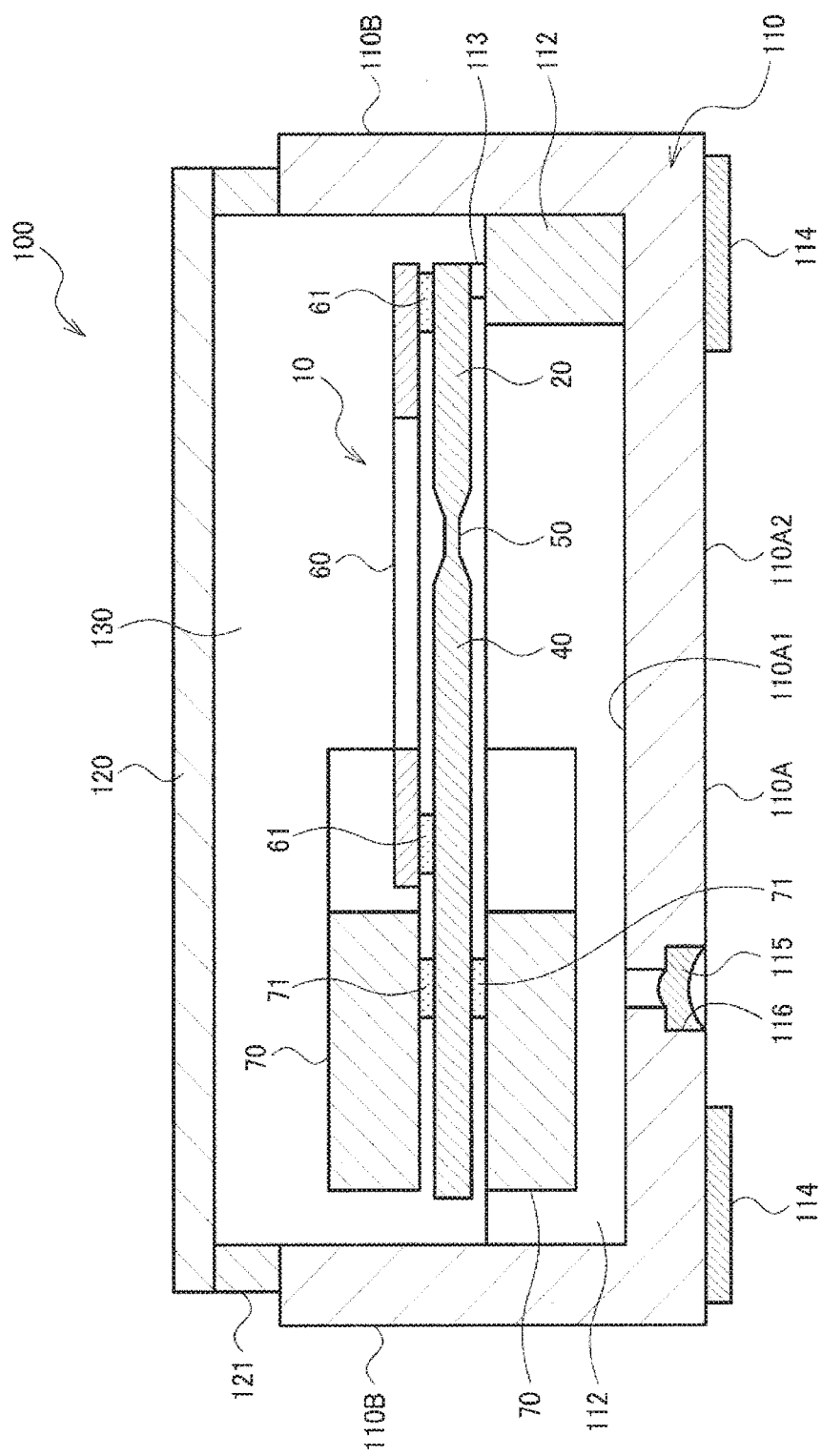
FIG. 2 is a cross-sectional view of a physical quantity sensor device according to an embodiment of the present disclosure.

The first arm portion 31, the second arm portion 32, and the third arm portion 33 have proximal ends connected to the base 20, and preferably, a fixed region 31A, a fixed region 32A, and a fixed region 33A are provided on the free ends, respectively. The constricted portion 50 as a connection portion is disposed between the base 20 and the movable portion 40, and connects the base 20 and the movable portion 40. The physical quantity measurement element 60 is constituted by, for example, a double-ended tuning fork type quartz crystal oscillator, and measures, for example, acceleration and pressure as a physical quantity. The physical quantity measurement element 60 is disposed (spans) across the constricted portion 50 in a plan view when seen in the thickness direction of the base 20 and is attached to the base 20 and the movable portion 40 through a joining portion 61 (fastener, see FIG. 2) such as an adhesive. Further, a weight (mass portion) 70 made of, for example, metal (SUS, copper, and the like) can be disposed on the free end side of the movable portion 40 which is a cantilever with the constricted portion 50 as a fulcrum. The weight 70 is not limited to being provided on the front surface side of the movable portion 40 as illustrated in FIG. 1, but can also be provided on the back surface side of the movable portion 40 (see FIG. 2). As illustrated in FIG. 1 and FIG. 2, the weight 70 is attached to the movable portion 40 by a joining portion 71 (fastener) such as an adhesive. Although the weight 70 illustrated in FIG. 1 moves up and down together with the movable portion 40, both end portions 70A and 70B (ends) of the weight 70 function as stoppers for preventing excessive amplitude by making contact with the arm portion 31 and the arm portion 32 illustrated in FIG. 1.

Stress is generated in the physical quantity measurement element 60 attached to the base 20 and the movable portion 40 by displacing the movable portion 40 with the constricted portion 50 as a fulcrum according to the physical quantities such as acceleration and pressure. A vibration frequency (resonance frequency) of the physical quantity measurement element 60 changes according to the stress applied to the physical quantity measurement element 60. Based on the change in the vibration frequency, the physical quantity can be detected.

FIG. 2 is a cross-sectional view illustrating a physical quantity sensor device 100 in which the physical quantity sensor 10 of FIG. 1 is incorporated. The physical quantity sensor device 100 includes a base 110 on which the physical quantity sensor 10 is mounted. In this embodiment, the base 110 is configured as a package base including a bottom wall 110A and side walls 110B. The base 110, together with a lid 120, forms a package for accommodating the physical quantity sensor 10 therein. The lid 120 is joined to an opening end of the base 110 through an adhesive 121.

On the bottom wall 110A of the base 110, a step portion 112 one step higher than an inner surface 110A1 of the bottom wall 110A is provided along, for example, three side walls 110B of four side walls 110B. The step portion 112 may protrude from the inner surface of the side wall 110B or may be integral with or separate from the base 110, but is a part constituting the base 110. As illustrated in FIG. 2, the physical quantity sensor 10 is fixed to the step portion 112 with an adhesive 113. Here, as the adhesive 113, it is preferable to use a resin-based (for example, epoxy resin) adhesive having a high elastic modulus. Since an adhesive such as low melting point glass is hard, the adhesive cannot absorb stress distortion generated at the time of joining and adversely affects the physical quantity measurement element 60. The positions of the fixed regions 31A to 33A where the physical quantity sensor 10 is fixed to the step portion 112 will be described later with reference to FIG. 1 and FIGS. 5 to 7.

In this embodiment, as illustrated in FIG. 1, the physical quantity measurement element 60 can be connected to electrodes (for example, gold electrodes) formed in the step portion 112 by bonding wires 62 and 62. In this case, it is unnecessary to form an electrode pattern on the base 20. The electrode pattern also provided on the base 20 may be connected to the electrodes formed on the step portion 112 of the base 110 through a conductive adhesive without adopting the bonding wires 62 and 62.

Figure 3:
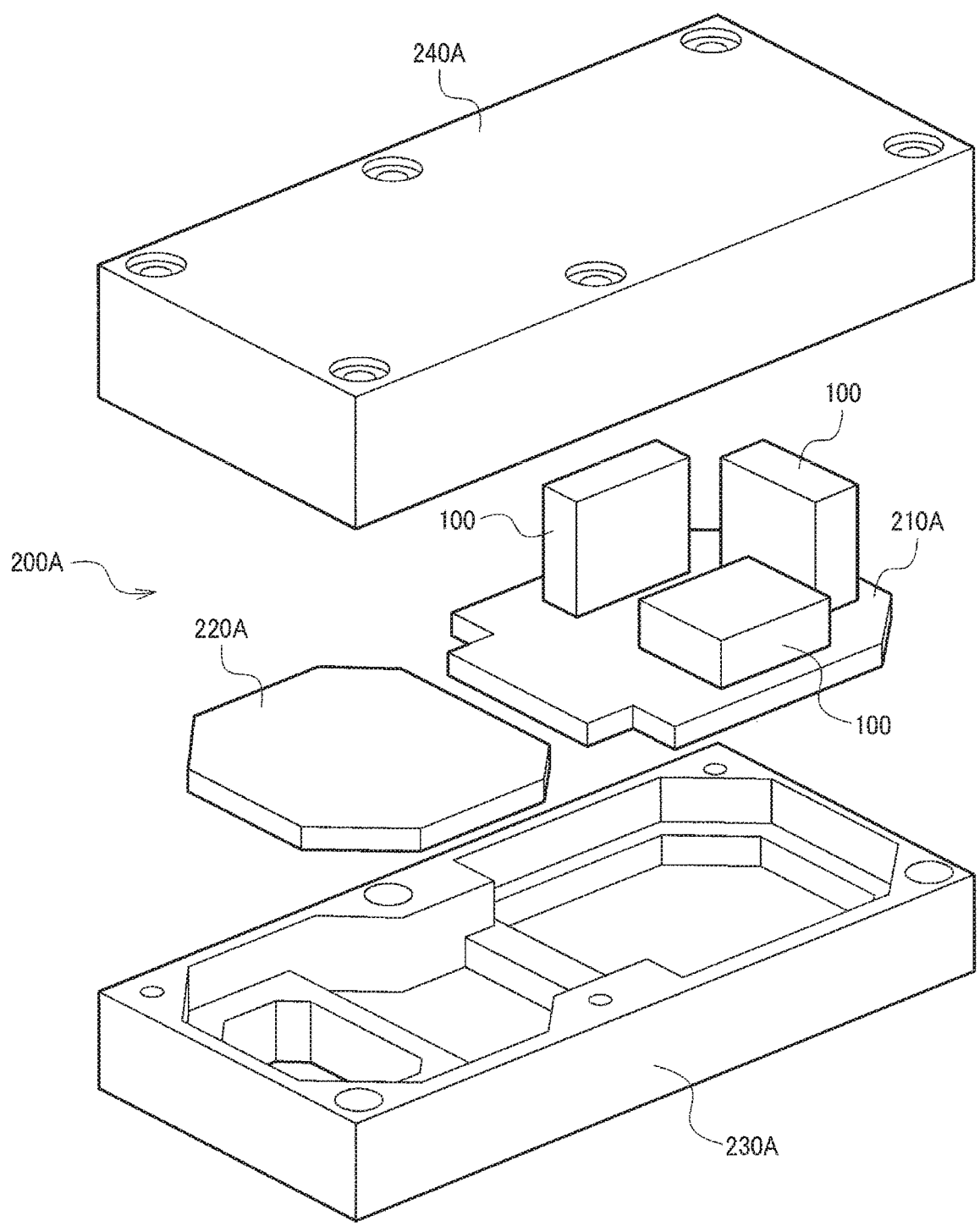
FIG. 3 is an exploded perspective view of a triaxial physical quantity sensor device according to an embodiment of the present disclosure.

On the outer surface (surface opposite to the inner surface 110A1) 110A2 of the bottom wall 110A of the base 110, an external terminal 114 used for mounting to an element on an electronic circuit board 210A illustrated in FIG. 3 is provided. The external terminal 114 is electrically connected to the physical quantity measurement element 60 through a wiring, an electrode, or the like (not illustrated).

For example, a sealing portion 115 for sealing the inside (cavity) 130 of a package formed by the base 110 and the lid 120 is provided on the bottom wall 110A. The sealing portion 115 is provided in a through-hole 116 formed in the base 110. The sealing portion 115 is provided by disposing a sealing material in the through-hole 116, heating and melting the sealing material, and solidifying the sealing material. The sealing portion 115 is provided to hermetically seal the inside of the package.

FIG. 3 is an exploded perspective view of a triaxial physical quantity sensor device 200A including three uniaxial physical quantity sensor devices 100. In FIG. 3 three physical quantity sensor devices 100 are mounted on the electronic circuit board 210A. In the three uniaxial physical quantity sensor devices 100, measurement axes are provided along three orthogonal axes to detect physical quantities of the three axes. The circuit board 210A is electrically connected to a connector board 220A. The circuit board 210A and the connector board 220A are accommodated in a package formed by a package base 230A and a lid 240A.

Figure 4:
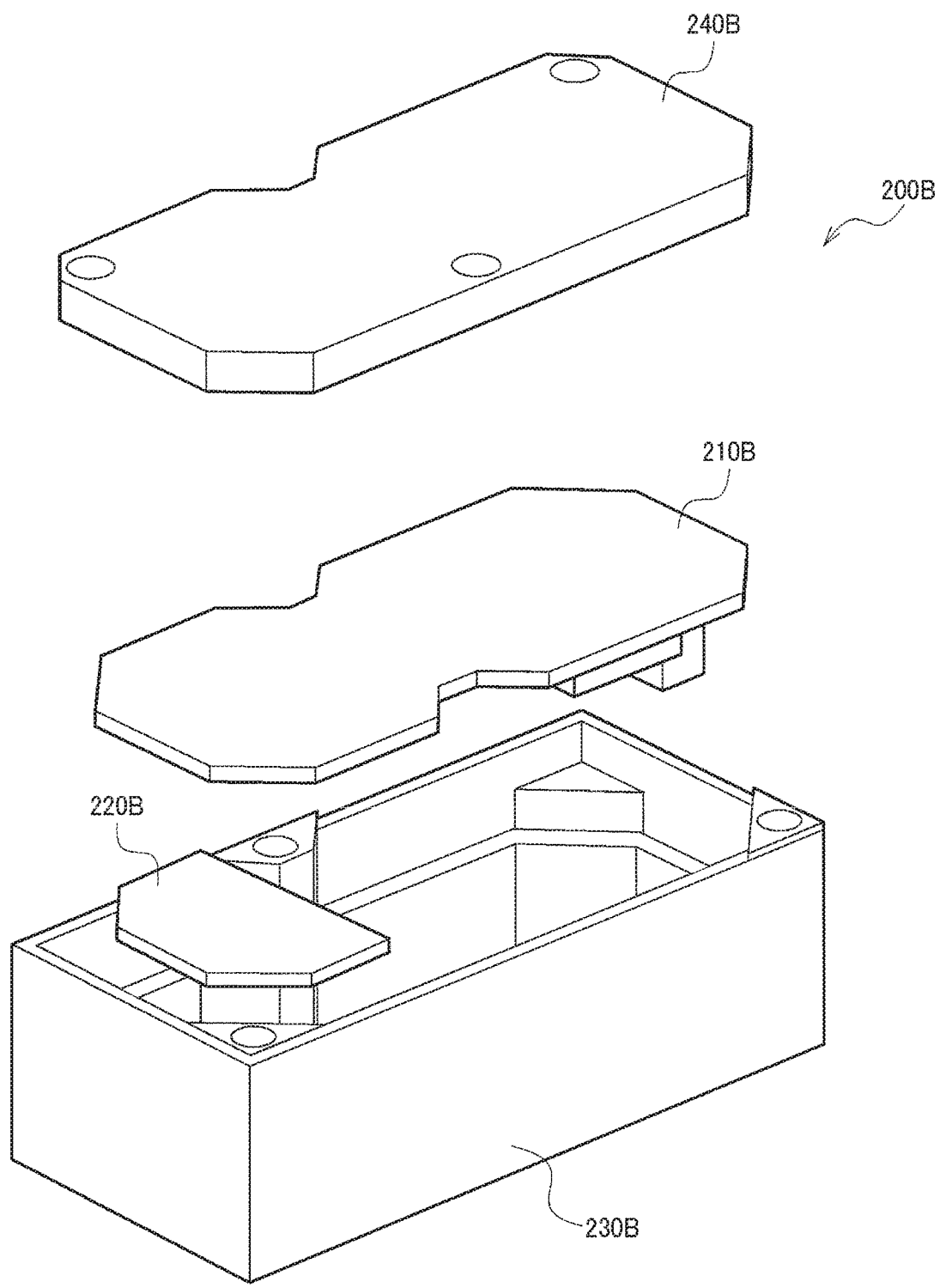
FIG. 4 is an exploded perspective view illustrating another example of the triaxial physical quantity sensor device.

FIG. 4 illustrates a triaxial physical quantity sensor device 200B which is different from that illustrated in FIG. 3. In FIG. 3, the circuit board 210A and the connector board 220A are juxtaposed on the same plane, but in FIG. 4, a circuit board 210B and a connector board 220B are juxtaposed in the vertical direction. Also in FIG. 4, the circuit board 210B and the connector board 220B are accommodated and held in a package formed by a package base 230B and a lid 240B.

2. Fixed Position of Physical Quantity Sensor with Respect to Base 2.1. First Embodiment In FIG. 1, the three arm portions 31 to 33, in which fixed regions 31A to 33A which are secured to the step portion 112 provided in a part of the base 110 are respectively provided, are illustrated. In FIG. 1, positions at which the fixed regions 31A to 33A are fixed to the step portion 112 are illustrated in a plan view. In this embodiment, the fixed regions 31A to 33A on the back surfaces (surface opposite to the surface on a side on which the physical quantity measurement element 60 is fixed) of the three arm portions 31 to 33 illustrated in FIG. 1 are fixed to the step portion 112.

Figure 5:
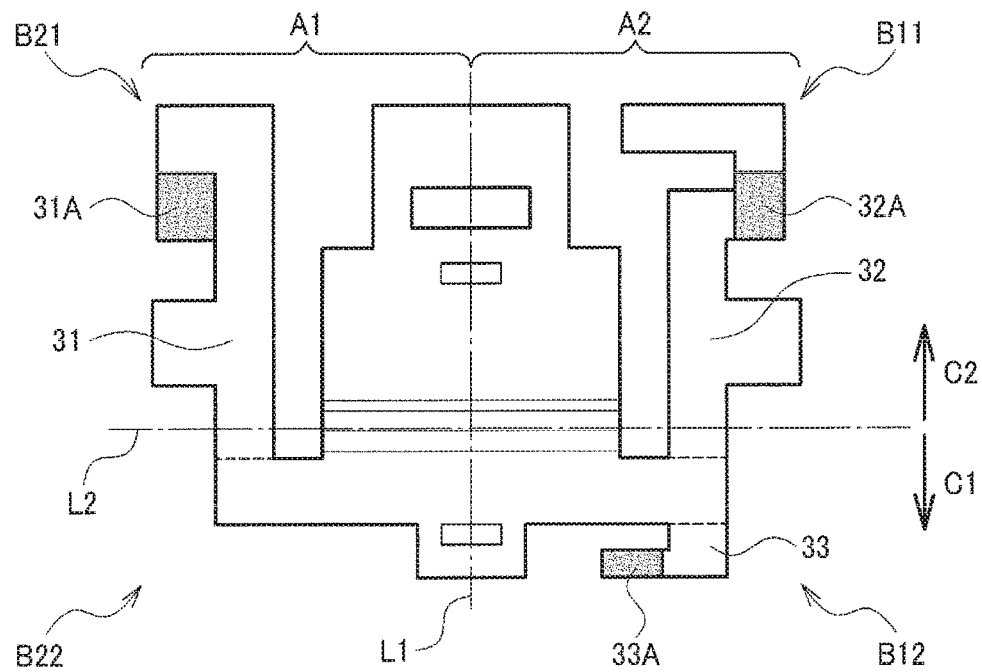
FIG. 5 is a plan view illustrating a disposition of fixed regions according to a first embodiment of the present disclosure.

Here, the positions of the fixed regions 31A to 33A illustrated in FIG. 1 will be described with reference to FIG. 5 when the physical quantity sensor 10 is viewed in a plan view. In FIG. 5, a straight line L1 (bi-sector) passing through the center of the physical quantity measurement element 60 along a direction that crosses the constricted portion 50 is referred to as a first straight line. Two regions partitioned by the first straight line L1 are referred to as a first (lateral) region A1 and a second (lateral) region A2. In FIG. 5, the left side of the first straight line L1 is set as the first region A1, and the right side thereof is set as the second region.

However, in FIG. 5, the right side of the first straight line L1 may be referred to as a first region and the left side thereof may be referred to as a second region. In this embodiment, the fixed region 31A is disposed in the first region A1 and the fixed regions 32A and 33A are disposed in the second region A2.

In FIG. 5, a straight line L2 (pivot axis) passing through the constricted portion 50 and orthogonal to the first straight line L1 is referred to as a second straight line. Four regions B11, B12, B21, and B22 that respectively belong to regions of a first quadrant to a fourth quadrant are partitioned by the first straight line L1 (first direction) and the second straight line L2 (second direction) of the two orthogonal axes. Further, a side close to a C1 side illustrated in FIG. 5 from the second straight line L2 is referred to as the "base side" of the physical quantity measurement element 60. Similarly, a side close to a side C2 illustrated in FIG. 5 from the second straight line L2 is referred to as the "movable portion side". A region B22 which is disposed in the first region A1 and closer to the base side (C1 side) than to the second straight line L2 is referred to as a third region B22. A region B12 which is disposed in the second region A2 and closer to the base side (C1 side) than to the second straight line L2 is referred to as a fourth region B12.

In the embodiment illustrated in FIG. 5, the fixed region 31A is disposed in the region B21 on the movable portion side (C2 side) of the first region A1. The fixed region 32A is disposed in the region B11 on the movable portion side (C2 side) of the second region A2. The fixed region 33A is disposed in the region (fourth region) B12 on the base side (C1 side) of the second region A2. That is, in the embodiment illustrated in FIG. 5, neither the fixed region 31A nor the fixed region 32A is provided in the third region B22 or the fourth region B12, and in FIG. 5, no fixed region is provided in the third region B22.

Here, in this embodiment, the reason why the first to third arm portions 31 to 33 connected to the base 20 are provided instead of fixing the entire outer circumference as in JP-A-2000-65856 discussed above is that a degree of freedom of deformation is given to locally fixed arm portions 31 to 33 and stress is concentrated on the first to third arm portions 31 to 33 to absorb stress distortion by deformation of the first to third arm portions 31 to 33. When stress distortion is absorbed by deformation of the first to third arm portions 31 to 33, it is possible to reduce or prevent transmission of stress distortion to the physical quantity measurement element 60. The physical quantity measurement element 60 measures a physical quantity by using, for example, a change in physical quantity measurement information generated in the physical quantity measurement element 60 due to a stress caused by acceleration. When a stress distortion caused by a source to be avoided originally (a mechanical overload at the time of manufacture or a difference in thermal expansion coefficients between dissimilar materials connected to each other) acts on the physical quantity measurement element 60, as a result of action of stress distortion on the physical quantity detecting element 60, physical quantity measurement information also changes and the measurement accuracy deteriorates. In contrast, in this embodiment, the measurement accuracy can be improved.

In this embodiment, in addition to adopting local fixation using the arm portions that deform without fixing around the entire circumference, the adverse influence of stress distortion is further reduced by limiting the positions of the locally fixed regions. In FIG. 5, a fixed region is not provided in the region B22 of the fourth quadrant. With this configuration, the degrees of freedom of deformation of the first to third arm portions 31 to 33 are further increased as compared with the case where the first to third arm portions 31 to 33 are locally fixed in the entire regions B11, B12, B21, and B22 of the first to fourth quadrants, thereby capable of absorbing stress distortion. In particular, since the fixed region is not provided in the third region B22 which is the base side (C1 side) of the second straight line L2, the base 20 is also easily deformed, and it is possible to effectively reduce the action of stress distortion on the physical quantity measurement element 60. For this reason, the fixed region 33A illustrated in FIG. 5 may be provided in the third region B22 instead of the fourth region B12. In either case, the fixed region is not disposed in one of the third region B22 or the fourth region B12.

2.2. Second Embodiment

Figure 6:
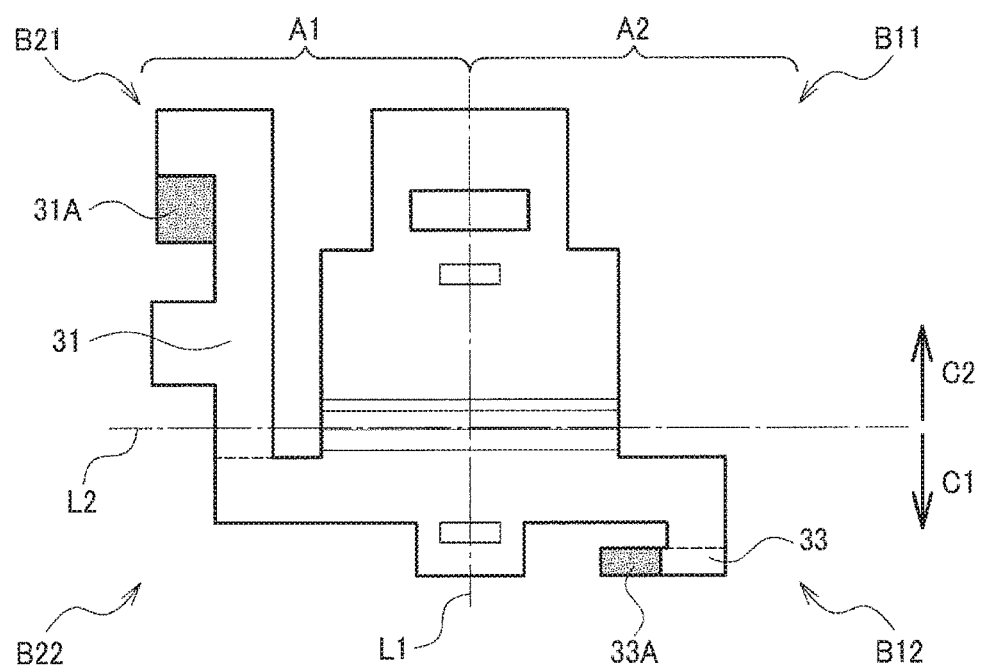
FIG. 6 is a plan view illustrating a disposition of fixed regions according to a second embodiment of the present disclosure.

FIG. 6 illustrates a second embodiment including fixed regions 31A and 33A illustrated in FIG. 5 but not the fixed region 32A. That is, the fixed regions illustrated in FIG. 6 are configured with the fixed region (referred to as the first fixed region) 31A disposed in the region (referred to as a fifth region) B21 positioned in the first region A1 to be closer to the movable portion side (C2 side) than to the second straight line L2 and the fixed region (referred to as a second fixed region) 33A disposed in the region (referred to as a sixth region) B12 positioned in the second region A2 to be closer to the base side (C1 side) than to the second straight line L2. By doing so, a support structure is changed from a three-point support illustrated in FIG. 5 to a two-point support, and the degrees of freedom of deformation of the arm portions 31 and 33 and the base 20 are further increased. However, since the first and second fixed regions 31A and 33A are provided in the regions B12 and B21 of the second and third quadrants positioned at diagonally opposed positions, it is possible to stably support the physical quantity sensor 10. For this reason, even if the first and second fixed regions are instead provided in the regions B11 and B22 of the first and fourth quadrants at diagonally opposed positions, the same effect can be obtained.

2.3. Third Embodiment

Figure 7:
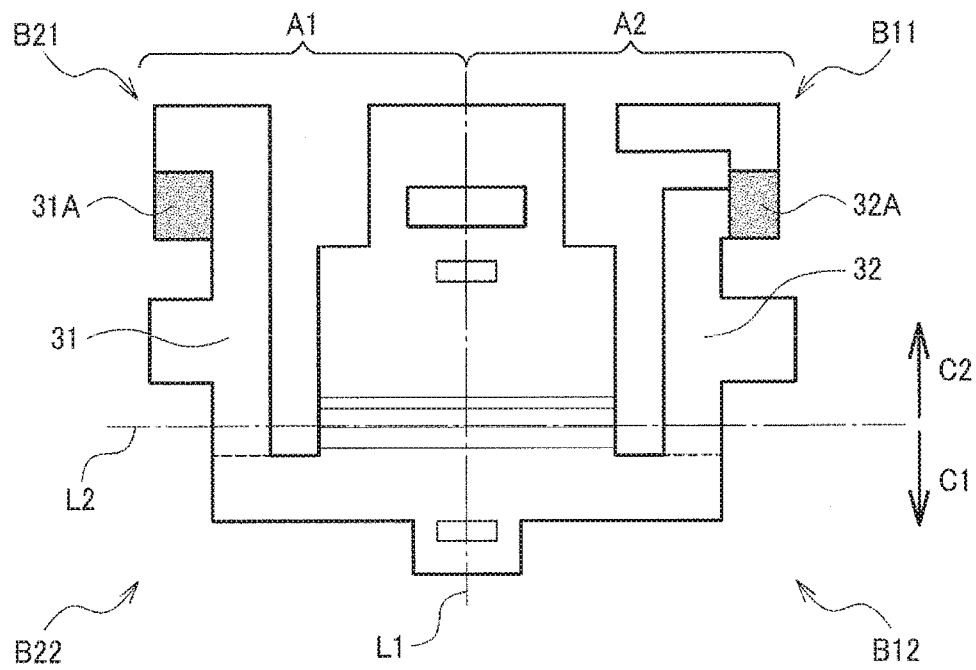
FIG. 7 is a plan view showing a disposition of fixed regions according to a third embodiment of the present disclosure.

FIG. 7 illustrates a third embodiment including the fixed regions 31A and 32A illustrated in FIG. 5 but not the fixed region 33A. That is, the fixed region illustrated in FIG. 7 is configured with the fixed region (referred to as the first fixed region) 31A disposed in the region (referred to as a fifth region) B21 positioned in the first region A1 to be closer to the movable portion side (C2 side) than to the second straight line L2 and the fixed region (referred to as the second fixed region) 32A disposed in the region (referred to as a sixth region) B11 positioned in the second region A2 to be closer to the movable portion side (C2 side) than to the second straight line L2. By doing so, a support structure is changed from a three-point support illustrated in FIG. 5 to a two-point support, and the degrees of freedom of deformation of the arm portions 31 and 32 are further increased. In this case, since the first and second fixed regions 31A and 32A are disposed in the first region A1 and the second region A2, it is possible to stably support the physical quantity sensor 10.

3. Evaluation of First Embodiment, Second Embodiment, and Third Embodiment

In order to evaluate whether or not stress distortion due to an unintended cause acted on the physical quantity measurement element 60, as illustrated in the following Table 1, a change in temperature characteristics of the physical quantity measurement element 60 (change in position of the average peak in the temperature characteristics), reproducibility, and hysteresis were evaluated. Here, in comparative examples 1 and 2 in the following Table 1, fixed regions are disposed in the four regions B11, B12, B21, and B22 in the first to fourth quadrants illustrated in FIGS. 5 to 7. In the comparative example 2, the arm portion is made thicker than that in the comparative example 1 to increase rigidity of the arm portion. In the comparative example 3 in the Table 1, fixed regions are disposed at two places (i.e., the regions B12 and B22 positioned in the second and fourth quadrants illustrated in FIGS. 5 to 7). Each of the comparative examples 1 to 3 is different from the first to third embodiments of the present disclosure in that the comparative examples 1 to 3 have fixed regions in two regions B12 and B22 positioned closer to the base side (C1 side) than to the second straight line L2, respectively.

TABLE 1

| | Reproducibility | Hysteresis | Average peak temperature |
|---|---|---|---|
| crystal oscillator itself | 0.1 mG | 0.1 mG | 25.2° C. |
| Comparative Example 1 | 0.8 mG | 0.5 mG | 5.3° C. |
| Comparative Example 2 | 1.6 mG | 4.5 mG | −31.4° C. |
| Comparative Example 3 | 2.1 mG | 1.2 mG | −38.3° C. |
| Third Embodiment | 0.1 mG | 0.2 mG | 25.3° C. |
| Second embodiment | 0.2 mG | 0.4 mG | 25.3° C. |
| First Embodiment | −0.1 mG | −0.2 mG | 23.2° C. |

3.1. Temperature Characteristics

Figure 8:
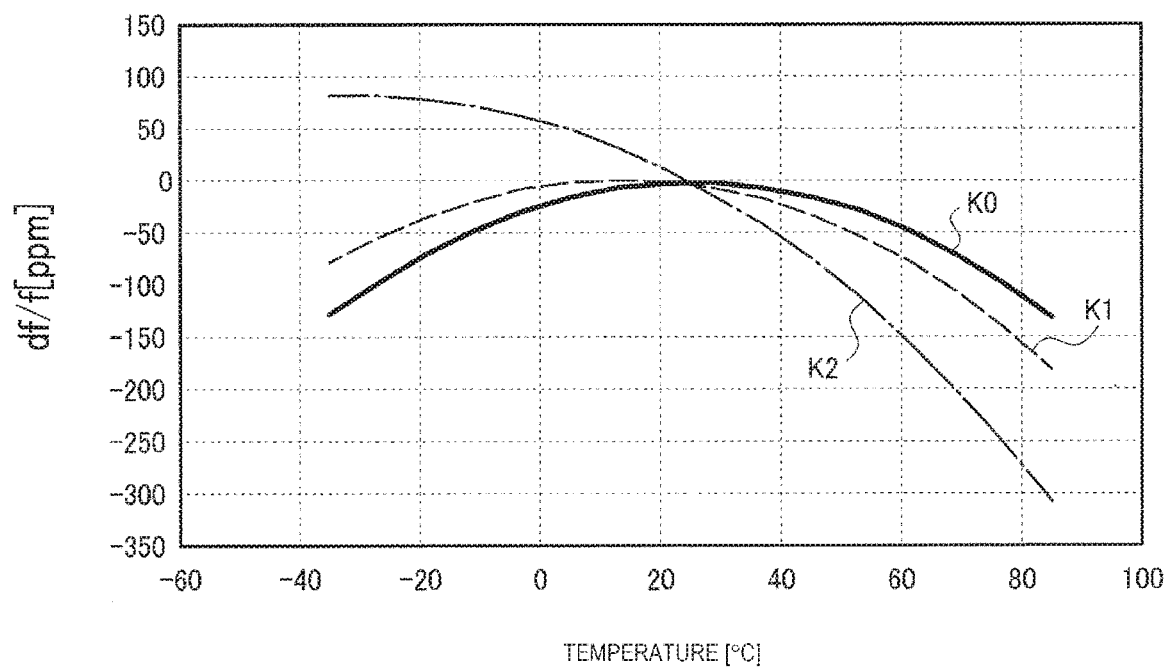
FIG. 8 is a characteristic diagram illustrating temperature characteristics of the physical quantity sensor device.

FIG. 8 illustrates the temperature characteristics of a quartz crystal oscillator which is an example of the physical quantity measurement element 60. In FIG. 8, the vertical axis represents a frequency change amount (df/f), and the horizontal axis represents a temperature (° C.). A characteristic K0 illustrates intrinsic temperature characteristics of the quartz crystal oscillator on which no stress distortion is acted. The characteristic K0 is the intrinsic temperature characteristics based on the Young's modulus of the quartz crystal, and the peak temperature is 25.2° C. (see also Table 1).

The characteristics K1 and K2 in FIG. 8 are characteristics of the comparative examples 1 and 2 in Table 1. When a stress acts on the quartz crystal oscillator due to the influence of thermal expansion coefficient difference or the like is applied, temperature characteristics K1 and K2 in FIG. 8 are inclined and the peak temperature is shifted in the minus direction. Since the characteristic K2 has a higher rigidity of the arm portion than the characteristic K1 and the effect of absorbing the stress distortion is small, inclination becomes larger.

As illustrated in Table 1, it can be seen that the average peak temperature of the comparative examples 1 to 3 is shifted to the minus side by more than 25.2° C. which is the peak temperature intrinsic to quartz crystal. On the other hand, in the first to third embodiments of the present disclosure, the average peak temperature is maintained in the vicinity of the peak temperature 25.2° C. intrinsic to quartz crystal. With this configuration, unnecessary stress acting on the physical quantity measurement element 60 is reduced in the first to third embodiments of the present disclosure in which a fixed region is not included in at least one of the regions B12 and B22 positioned closer to the base side (C1 side) than to the second straight line L2.

3.2. Reproducibility

The "reproducibility" illustrated in Table 1 represents how much the physical quantity (acceleration in Table 1) detected by the physical quantity measurement element 60 deviates between the start point and the end point when the temperature is raised or lowered is by the magnitude (mG) of deviated acceleration. The larger the absolute value shifted in the positive direction or the negative direction is, the worse the reproducibility is illustrated. It can be seen that the first to third embodiments of the present disclosure in which temperature drift is small are more excellent in terms of reproducibility than the comparative examples 1 to 3 in which temperature drift is high.

3.3. Hysteresis

The "Hysteresis" illustrated in Table 1 represents the maximum value of the deviation of the physical quantity (acceleration in Table 1) measured by the physical quantity measurement element 60 when the temperature is raised or lowered by the magnitude (mG) of deviated acceleration. It can be seen that the first to third embodiments of the present disclosure in which temperature drift is small are more excellent in terms of hysteresis than the comparative examples 1 to 3 in which the temperature drift is large.

Other evaluation items other than the above-mentioned temperature characteristics, reproducibility, and hysteresis were also examined.

3.4. Stability During Assembly

Figure 9:
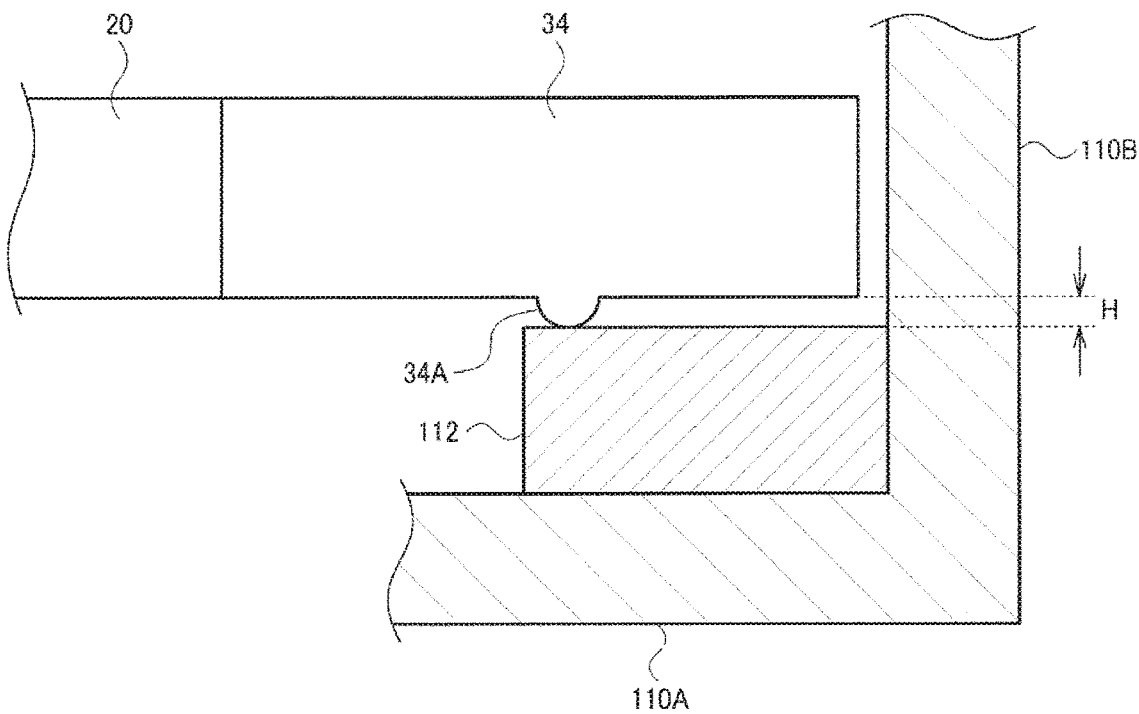
FIG. 9 is a view illustrating a protrusion provided on a third arm portion.

As illustrated FIG. 5, if there are three fixed regions 31A to 33A, since three points are supported by the step portion 112 of the base 110 illustrated in FIG. 2, the physical quantity sensor 10 is stably placed on the step portion 112. On the other hand, in FIG. 6 and FIG. 7, since the two points are supported by the two fixed regions, stability at the time of being placed on the step portion 112 and assembled is poor. Accordingly, in the embodiments of FIGS. 5 to 7, particularly the embodiments of FIGS. 6 and 7, it is possible to further provide a third arm portion 34 connected to the base 20 as illustrated in FIG. 9. The third arm portion 34 may include a protrusion 34A formed on a surface opposite to the surface to which the physical quantity measurement element 60 is connected in at least one region among the four regions B11, B12, B21, and B22 in which the fixed region is not disposed in a plan view. The height H of the protrusion 34A is substantially equal to the thickness T of the joining portion (adhesive) 113 illustrated in FIG. 2. With this configuration, when the physical quantity sensor 10 is placed on the base 110, the physical quantity sensor 10 is supported at three points by the two fixed regions and abutting contact of the protrusion 34A, and the stability during assembly is improved. However, the protrusion 34A is not joined to the step portion 112.

3.5. Impact Resistance

Depending on the use of the physical quantity sensor 10, impact resistance is also required. To increase the impact resistance, it is conceivable to increase the rigidity of the arm portion. As can be seen from the deterioration of the characteristics of the comparative example 2 in which the rigidity of the arm portion is increased as compared with the comparative example 1, securing the impact resistance and improving the temperature characteristic of the physical quantity sensor 10 have a tradeoff with each other. Even if the rigidity of the arm portion is increased to secure the impact resistance in the first to third embodiments of the present disclosure, deterioration of the temperature characteristic of the physical quantity sensor 10 can be suppressed in comparison with the comparative examples 1 to 3.

As described above, in the first to third embodiments of the present disclosure, in the physical quantity sensor 10 including the base 20 illustrated in FIG. 1, at least two arm portions (any one of 31A to 33A, 31A and 32A, and 31A and 33A), the movable portion 40, the constricted portion 50, and the physical quantity measurement element 60, the fixed regions (31A to 33A) illustrated in FIGS. 5 to 7 are disposed in the first region A1 and the second region A2 partitioned by the first straight line L1 passing through the center of the physical quantity measurement element 60 along the direction crossing the constricted portion 50 in a plan view, and are not disposed in at least one of the third region B22 positioned in the first region A1 to be closer to the base side (C1 side) than to the second straight line L2 and the fourth region B12 positioned in the second region A2 to be closer to the base side (C1 side) than to the second straight line L2 among the four regions (B1, B12, B21, and B22) partitioned by the first straight line L1 and the second straight line L2 passing over the constricted portion 50 and orthogonal to the first straight line L1 in a plan view. With this configuration, the stress distortion caused by a source to be avoided originally (a mechanical overload at the time of manufacture or a difference in thermal expansion coefficient between dissimilar materials connected to each other) acts on the physical quantity measurement element 60 is reduced. Thus, it is possible to provide the physical quantity sensor 10 excellent in reproducibility, hysteresis, temperature characteristics (shift of the average peak temperature) illustrated in Table 1 and the physical quantity sensor device 100 having the physical quantity sensor 10 mounted on the base 110.

3.6. Joining of Physical Quantity Sensor and Base

In this embodiment, the physical quantity measurement element 60 of the physical quantity sensor 10 can be connected to the electrode formed in the step portion 112 by the bonding wires 62 and 62 illustrated in FIG. 1. This is because there is no possibility that the bonding wires 62 and 62 are disconnected since the stress distortion described above does not act on the physical quantity measurement element 60. By using the bonding wires 62 and 62, there is no need to connect an electrode pattern provided on the base 20 to a gold electrode on the step portion 112 through a conductive adhesive. Adhesion between the gold electrode and the conductive adhesive is easy to peel off because the intermolecular force decreases at high temperature, but such an adverse effect can be eliminated when bonding wires 62 and 62 are used.

The first to third fixed regions 31A to 33A of the physical quantity sensor 10 and the step portion 112 of the base 110 are joined with an adhesive, preferably a resin-based adhesive 113, as described above. In this case, the joining illustrated in FIG. 10 or FIG. 11 can be adopted.

Figure 10:
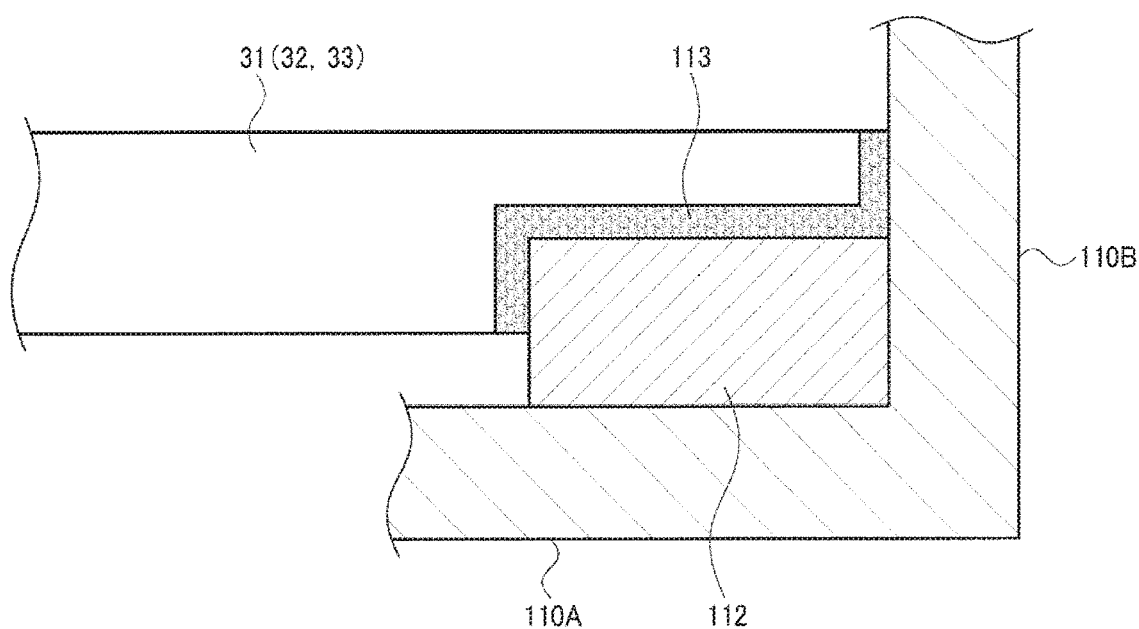
FIG. 10 is a view illustrating another example of joining of an arm portion and a base.
Figure 11:
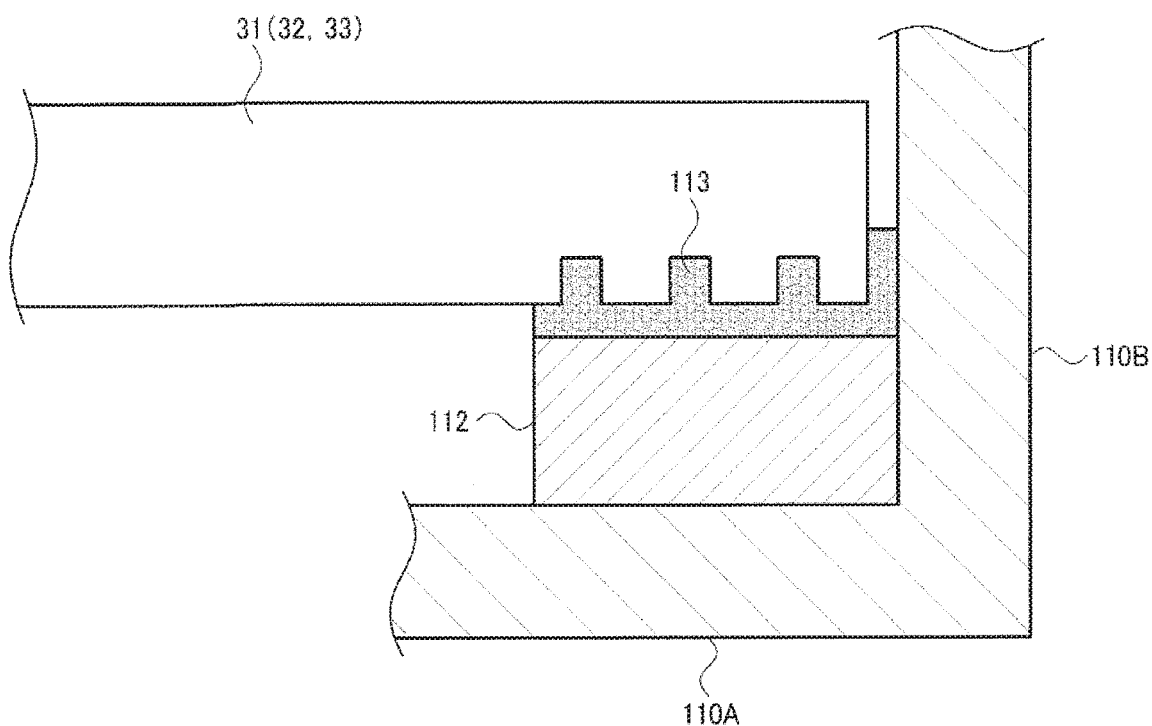
FIG. 11 is a view illustrating still another example of joining of the arm portion and the base.

In FIG. 10, in the first to third arm portions 31 to 33, for example, quartz crystal which is a base material is half-etched, and the thickness of the free end is made thin. In FIG. 11, in the first to third arm portions 31 to 33, for example, quartz crystal which is a base material is locally etched through a mask or the like to form a groove at the free end. In FIGS. 10 and 11, the resin-based adhesive 113 is filled in the gap between the free ends of the first to third arm portions 31 to 33, the step portion 112, and side walls 110B. With this configuration, an adhesion area (surface area) is increased and strength is increased. In FIG. 10, furthermore, when the physical quantity sensor 10 is mounted on the base 110, since rotation and misalignment are unlikely to occur, assembly workability is improved.

4. Apparatus Using Physical Quantity Sensor Device

Hereinafter, an apparatus using the physical quantity sensor device having the configuration described above will be described with reference to FIGS. 12 to 20.

4.1. Inclinometer

Figure 12:
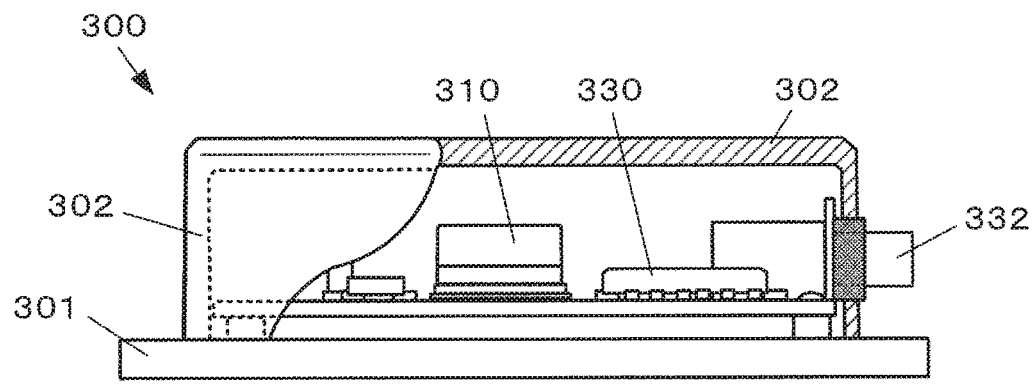
FIG. 12 is a side view illustrating an inclinometer including the physical quantity sensor device.

FIG. 12 is a diagram illustrating a configuration example of the inclinometer, and is a side view illustrating a partial cross section.

An inclinometer 300 is a device that outputs a signal corresponding to an inclination angle of a position where the inclinometer 300 is installed. Specifically, the inclinometer 300 includes a physical quantity sensor device 310 having the structure of the physical quantity sensor device 200A (200B) of the first embodiment, a calculator 330 for calculating the inclination angle based on the output signal of the physical quantity sensor device 310, and an external output terminal 332 for outputting a signal according to the inclination angle calculated by the calculator 210 to the outside in an inner space defined by an under case 301 and an upper case 302. The inclinometer 300 may appropriately include other elements. For example, a built-in battery, a power supply circuit, a wireless device, and the like.

The inclination calculator 330 is a circuit that computes the inclination angle from the output signal of the physical quantity sensor device 310 and outputs a signal corresponding to the inclination angle and can be realized by, for example, a general purpose integrated circuit (IC), a field programmable gate array (FPGA), or the like.

From the physical quantity sensor device 310, for example, accelerations in directions of the x-axis, y-axis, and z-axis which are three orthogonal axes are output. The inclinometer 300 measures inclination angles (angles between the x-axis, y-axis, and z-axis and the horizontal plane) of the x-axis, y-axis, and z-axis from accelerations in the x-axis, y-axis, and z-axis directions. For example, the inclinometer 300 may be mounted on the floor surface near the center of gravity of a ship so that the x-axis faces the bow direction of the ship, the y-axis faces the port side of the ship, and the z-axis faces the floor surface vertical direction.

Figure 13:
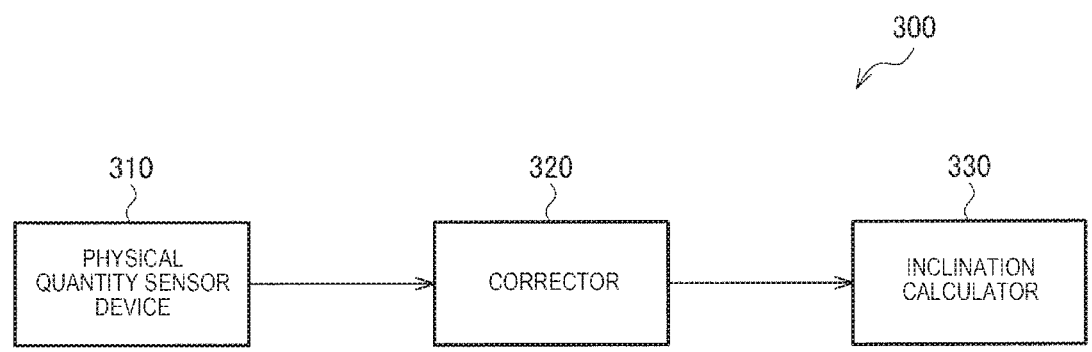
FIG. 13 is a block diagram of the inclinometer including the physical quantity sensor device.

As illustrated in FIG. 13, a corrector 320 (processor) can be included between the physical quantity sensor device 310 and the inclination calculator 330. The corrector 320 corrects accelerations in the x-axis, y-axis, and z-axis directions output from the physical quantity sensor device 310. For example, the corrector 320 performs alignment correction of accelerations in the x-axis, y-axis, and z-axis directions output from the physical quantity sensor device 310, offset correction, temperature drift correction, and the like. The corrector 320 may be omitted when the alignment of acceleration output from the physical quantity sensor device 310, the offset, the temperature drift, and the like are small.

The inclination calculator 330 (corresponding to the calculator according to the present disclosure, e.g., a circuit, processor or CPU) can calculate the inclination of each axis with respect to the horizontal plane based on the accelerations in the x-axis, y-axis, and z-axis directions corrected by the corrector 320.

Figure 14:
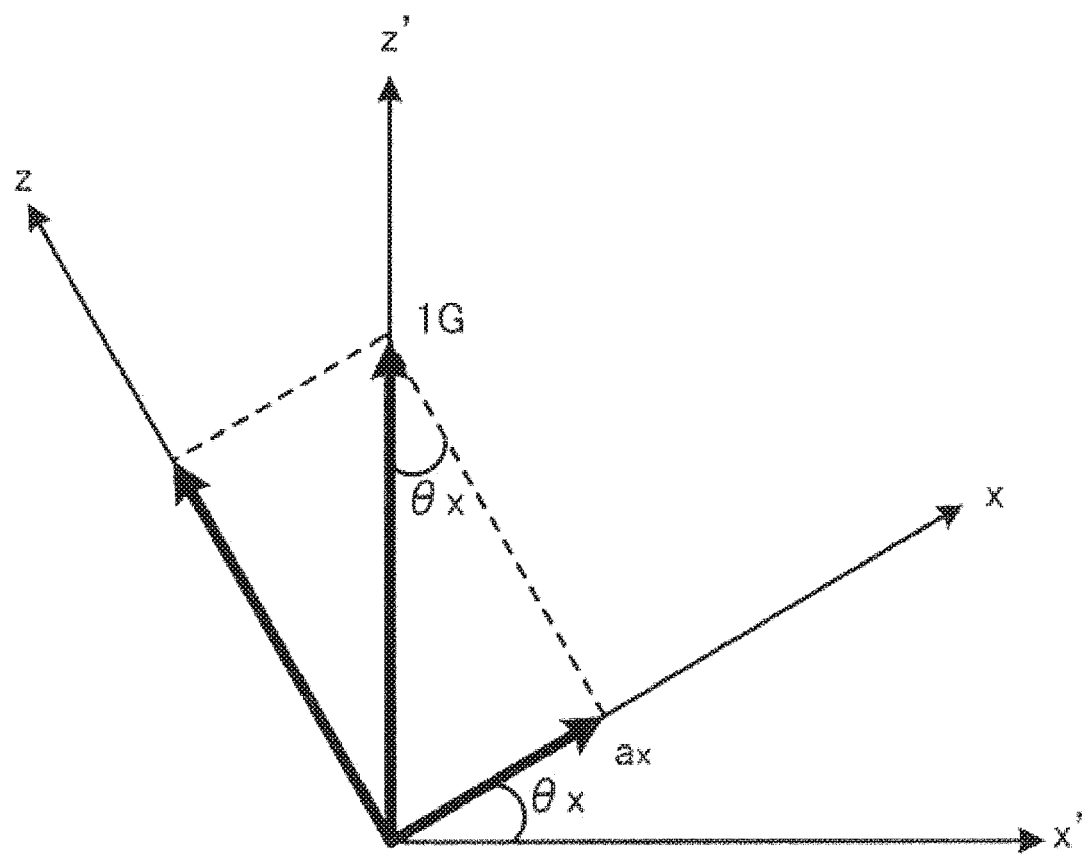
FIG. 14 is a coordinate view for explaining an example of calculation of an inclination angle.

FIG. 14 is a view for explaining a calculation example of the inclination angle. "x'" illustrated in FIG. 14 indicates an axis parallel to the horizontal direction, and "z'" indicates an axis parallel to the direction of gravity (vertical). "x" indicates the x-axis of the physical quantity sensor device 310. "z" indicates the z-axis of the physical quantity sensor device 310. It is assumed that the "y-axis" of the physical quantity sensor device 310 faces the back side of the page. The direction of gravitational acceleration is upward in FIG. 14.

As illustrated in FIG. 14, the x-axis of the physical quantity sensor device 310 is assumed to be inclined at an angle "$\theta_x$" about the y-axis as a rotation axis. In this case, it is assumed that the acceleration (gravitational acceleration component) in the x-axis direction output from the acceleration sensor 11 is "$a_x$", the following expression (1) is established.

$$\sin\theta_x = \frac{a_x}{1G} \qquad (1)$$

"1G" expressed in the expression (1) is gravitational acceleration and "1G=9.80665 m/s$^2$".

From the expression (1), inclination "$\theta_x$" of the x-axis with respect to the horizontal direction is expressed by the following expression (2).

$$\theta_x = \sin^{-1}\frac{a_x}{1G} \qquad (2)$$

Similarly, inclinations "$\theta_y$" and "$\theta_z$" with respect to the horizontal direction of the y-axis and z-axis are expressed by the following expressions (3) and (4).

$$\theta_y = \sin^{-1}\frac{a_y}{1G} \qquad (3)$$

$$\theta_z = \sin^{-1}\frac{a_z}{1G} \qquad (4)$$

The "$a_y$" in the expression (3) is acceleration in the y-axis direction and "$a_z$" in the expression (4) is acceleration in the z-axis direction.

That is, the inclination calculator 330 calculates the inclination angles of the x-axis, y-axis, and z-axis with respect to the horizontal direction by performing computation expressed in the expressions (2) to (4) on the basis of the accelerations "$a_x$", "$a_y$", and "$a_z$" in the x-axis, y-axis, and z-axis directions output from the corrector 320 and the gravitational acceleration "1G".

The inclination calculator 330 may calculate the inclination angle of each axis using the gravitational acceleration (1G) set (stored) in the inclinometer 300 in advance. In this case, for a value of the gravitational acceleration which is set in the inclinometer 300, the latitude at which the inclinometer 300 is used may be taken into consideration.

The inclination calculator 330 may calculate gravitational acceleration from the acceleration output from the corrector 320. For example, the inclination calculator 330 can calculate the gravitational acceleration by "$(a_x^2+a_y^2+a_z^2)^{1/2}$".

4.2. Inertia Measurement Device

Figure 15:
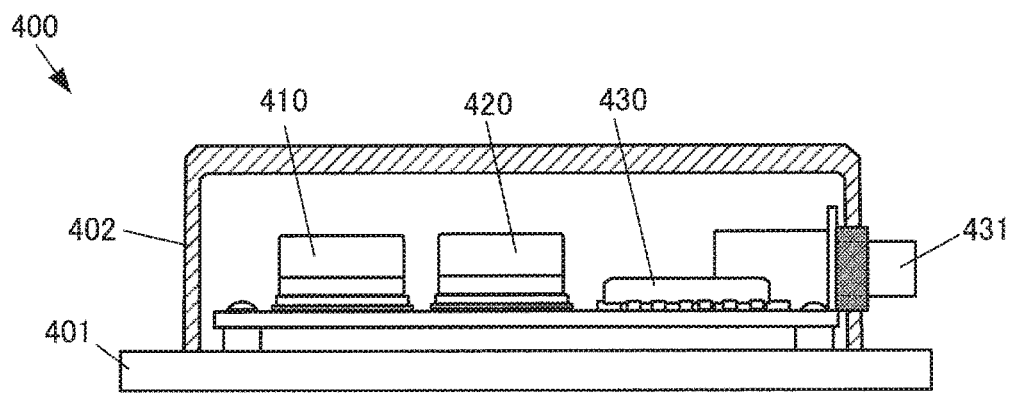
FIG. 15 is a side view illustrating an inertia measurement device including the physical quantity sensor device.
Figure 16:
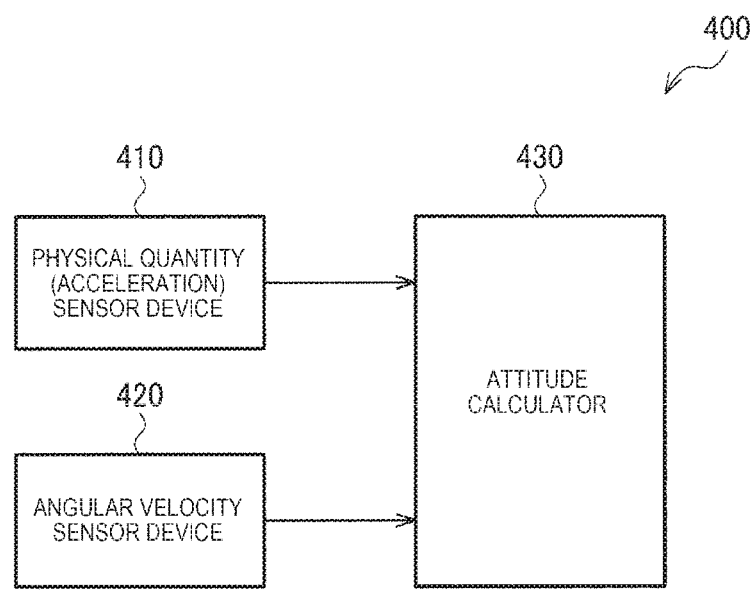
FIG. 16 is a block diagram of the inertia measurement device.

FIG. 15 is a diagram illustrating a configuration example of an inertia measurement device which is an inertial measurement unit (IMU), and is a side view illustrating a partial cross section. FIG. 16 is a block diagram of the inertia measurement device. The inertia measurement device 400 is an inertia measurement device attached to a vehicle, and includes a physical quantity sensor device 410 having the same structure as the physical quantity sensor device 200A (200B) of the embodiment, an angular velocity sensor device 420, an attitude calculator (circuit) 430 that calculates an attitude of the vehicle based on an acceleration signal of the physical quantity sensor device 410 and an angular velocity signal of the angular velocity sensor device 420, and an external output terminal 431 for outputting a signal corresponding to the attitude calculated by the circuit 430 to the outside, in the inner space defined by an under case 401 and an upper case 402. The inertia measurement device 400 may include, for example, a built-in battery, a power supply circuit, a wireless device, and the like.

The circuit 430 is realized by, for example, a general purpose integrated circuit (IC) or a field programmable gate array (FPGA), and calculates the attitude of the vehicle to which the inertia measurement device 400 is attached from the acceleration signal of the physical quantity sensor device 410 and the angular velocity signal of the angular velocity sensor device 420, and outputs a signal corresponding to the attitude. The method of measuring the attitude of the vehicle from the acceleration and the angular velocity is well known and will be omitted.

According to the inertia measurement device 400 of this embodiment, the physical quantity sensor device 410 uses the structure of the sensor device 200A (200B) of this embodiment. For that reason, since accuracy of the acceleration signal, which is the output of the physical quantity sensor device 410, is high, measurement accuracy of the attitude of the vehicle can be improved as compared with the inertia measurement device of the related art.

4.3. Structure Monitoring Device

Figure 17:
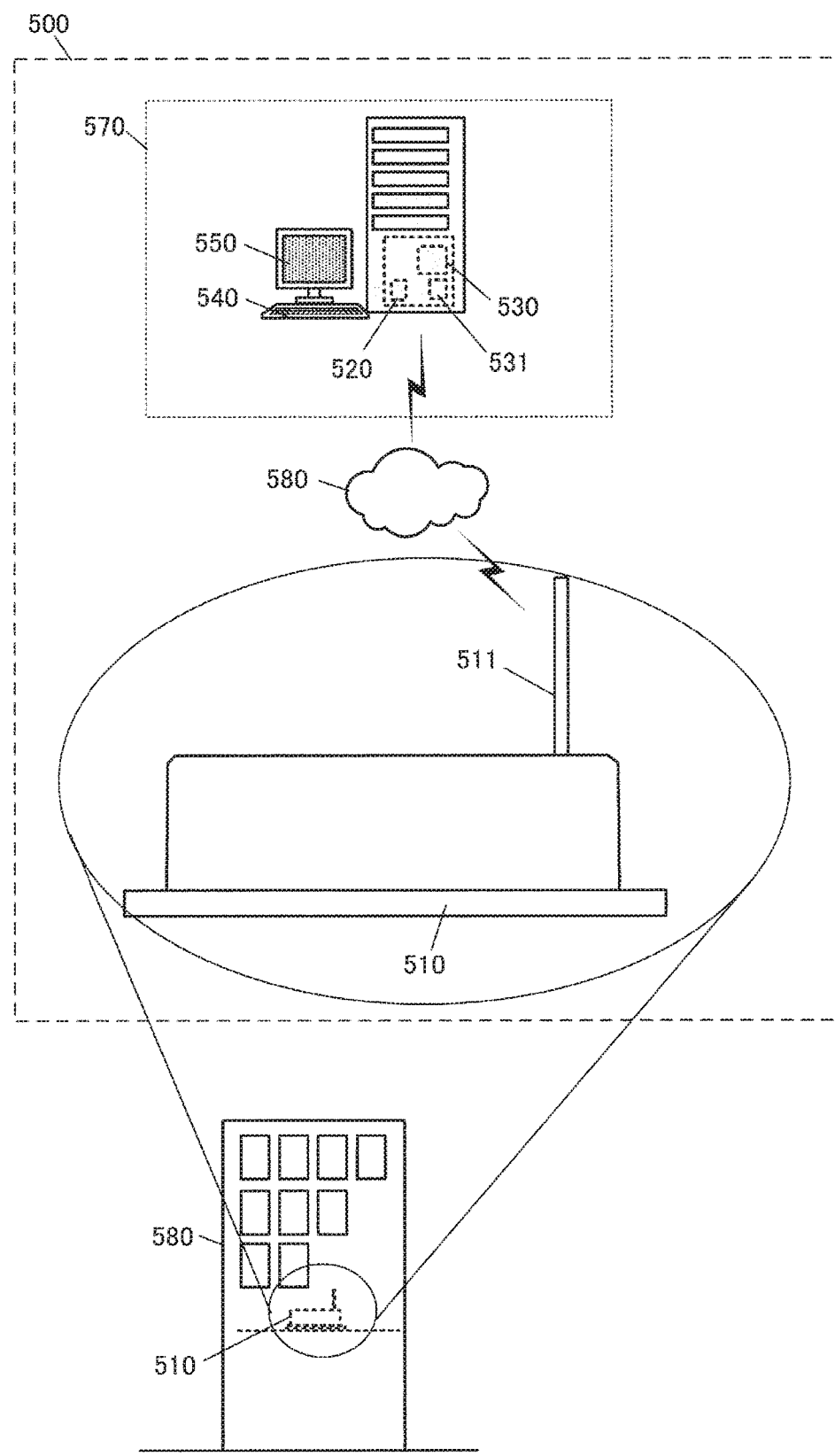
FIG. 17 is a schematic view illustrating a structure monitoring device including the physical quantity sensor device.
Figure 18:
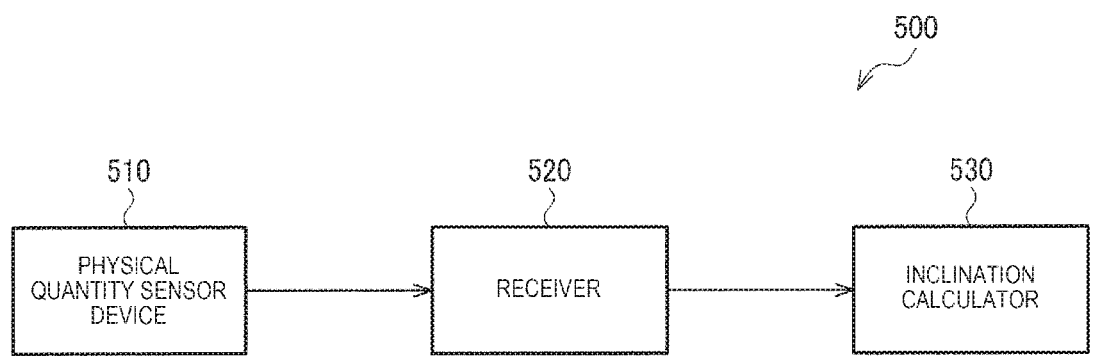
FIG. 18 is a block diagram of the structure monitoring device.

FIG. 17 illustrates a structural health monitoring (SHM) which is a structure monitoring device 500. The structure monitoring device 500 has the same structure as the physical quantity sensor device 200A (200B) of the embodiment and includes a physical quantity sensor device 510 attached to a structure 590 to be monitored. The physical quantity sensor device 510 includes a transmitter 511 that transmits a measurement signal. The transmitter 511 may be realized as a communication module and an antenna separate from the physical quantity sensor device 510.

The physical quantity sensor device 510 is connected to, for example, a monitoring computer 570 through a wireless or priority communication network 580. The monitoring computer 570 includes a receiver 520 connected to the physical quantity sensor device 510 through the communication network 580 and an inclination calculator 530 for calculating an inclination angle of the structure 590 based on a reception signal of the receiver 520 (see also FIG. 18).

In this embodiment, the inclination calculator 530 is realized by an application specific integrated circuit (ASIC), a field programmable gate array (FPGA) or the like mounted on the monitoring computer 570. However, a configuration in which the inclination calculator 530 is realized by software by performing operation processing on a program stored in an IC memory 531 by a processor such as a central processing unit (CPU) may be adopted. The monitoring computer 570 can receive various operation inputs of the operator through a keyboard 540 and display the result of operation processing on a touch panel 550.

According to the structure monitoring device 500 of this embodiment, inclination of the structure 590 is monitored using the physical quantity sensor device 200A (200B) of this embodiment. For that reason, it is possible to utilize measurement of highly accurate acceleration which is an operation effect of the physical quantity sensor device 200A (200B), it is possible to accurately detect the inclination of the structure 590 to be monitored, and it is possible to improve monitoring quality of the structure 590.

4.4. Vehicle

Figure 19:
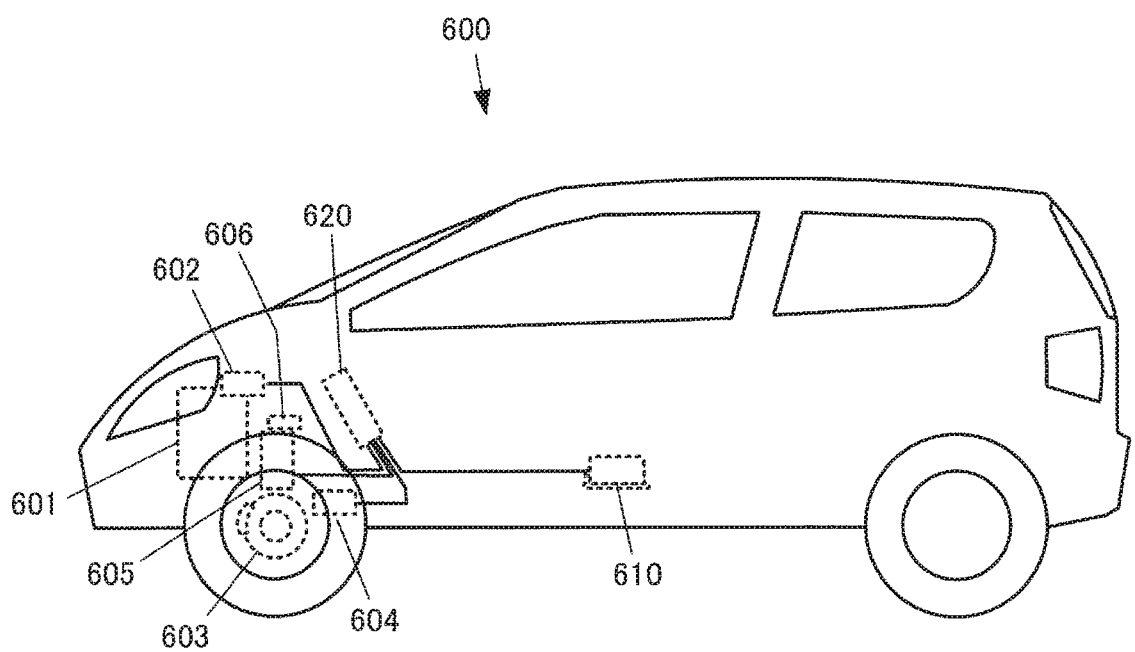
FIG. 19 is a schematic view illustrating a vehicle including the physical quantity sensor device.

FIG. 19 is a diagram illustrating a configuration example of a vehicle. In this embodiment, a vehicle 600 is exemplified as a passenger car, but a vehicle type can be appropriately changed. In addition, the vehicle 600 may be a small boat, an automatic transporting device, an in-yard transporting vehicle, a forklift, or the like.

The vehicle 600 includes a physical quantity sensor device 610 having the same structure as that of the physical quantity sensor device 200A (200B) of the embodiment and an automatic operation controller (controller) 620 for controlling at least one of acceleration, braking, and steering based on an acceleration signal of the physical quantity sensor device 610, and can switch execution or non-execution of the automatic operation based on the measurement signal of the physical quantity sensor device 610.

The controller 620 is realized by an in-vehicle computer. The controller 620 is connected to various sensors and controllers such as the physical quantity sensor device 610, a throttle controller 602, a brake controller 604, a steering controller 606, and the like through a communication network such as an in-vehicle local area network (LAN) so that signals can be transmitted and received to and from the controller 620 and the sensors and controllers and vice versa. Here, a throttle controller 602 is a device that controls output of an engine 601. A brake controller 604 is a device that controls the operation of a brake 603. A steering controller 606 is a device that controls the operation of a power steering 605. The types of sensors and controllers connected to the controller 620 are not limited to these, and can be appropriately set.

Then, the controller 620 is a built-in operation device, and performs operation processing based on the acceleration measurement signal of the physical quantity sensor device 610 to determine whether the automatic operation is to be executed or not. When the automatic operation is to be executed, the controller 620 transmits a control command signal to at least one of the throttle controller 602, the brake controller 604, and the steering controller 606, and controls at least one of acceleration, braking, and steering.

The contents of the automatic control can be set appropriately. For example, when acceleration measured by the physical quantity sensor device 610 reaches a threshold value that is considered to cause spin or corner-out during cornering, control may be performed to prevent spin or corner-out. When the acceleration measured by the physical quantity sensor device 610 reaches a threshold value which is considered to have a possibility that a sudden forward or backward movement occurs due to an erroneous operation during stop, control may be performed such that the throttle is forcibly fully closed and sudden braking is forcibly activated.

An advanced driver assistance systems (ADAS) locator used for the automatically operated vehicle 600 illustrated in FIG. 19 includes, in addition to an inertial sensor including the physical quantity sensor device 610, a global navigation satellite system (GNSS) receiver, and a map database storing map data. The ADAS locator measures a traveling position of the vehicle in real time by combining a positioning signal received by the GNSS receiver and a measurement result of the inertial sensor. The ADAS locator reads the map data from the map database. An output from the ADAS locator including the physical quantity sensor device 610 is input to the automatic operation controller 620. The automatic operation controller 620 controls at least one of acceleration, braking, and steering of the vehicle 600 based on the output (including a measurement signal from the physical quantity sensor device 610) from the ADAS locator.

Figure 20:
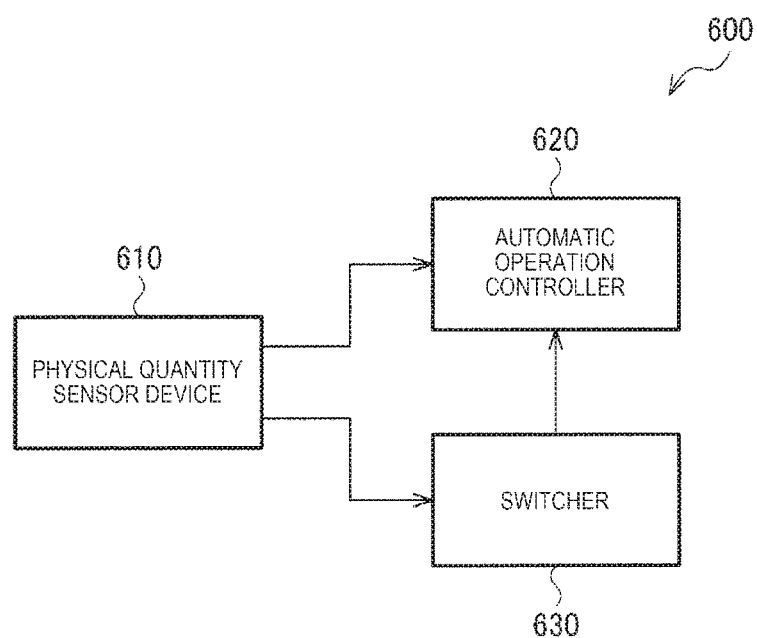
FIG. 20 is a block diagram of the vehicle.

FIG. 20 is a block diagram illustrating a system related to the vehicle 600. A switcher 630 switches execution or non-execution of the automatic operation in the automatic operation controller 620 based on a change in the output (including change in the measurement signal from the physical quantity sensor device 610) from the ADAS locator. The switcher 630 outputs a signal for switching from execution of the automatic operation to non-execution of the automatic operation to the controller 620, for example, in a case of abnormality in which measurement capability of the sensor (including the physical quantity sensor device 610) in the ADAS locator is deteriorated.

The global navigation satellite system (GNSS) described above may use a global positioning system (GPS) as a satellite positioning system, for example. Alternatively, one or more of the satellite positioning systems such as a European geostationary-satellite navigation overlay service (EGNOS), a quasi zenith satellite system (QZSS), a global navigation satellite system (GLONASS), GALILEO, a beidou navigation satellite system (BeiDou) may be used. A stationary satellite type satellite-based augmentation system (SBAS) such as a wide area augmentation system (WAAS) and a European geostationary-satellite navigation overlay service (EGNOS) may be used for at least one of the satellite positioning systems.

Although the embodiments have been described in detail above, it will be easily understood by those skilled in the art that many modifications are possible that do not deviate from the novel matters and effects of the present disclosure. Accordingly, all such modifications are included in the scope of the present disclosure. For example, in the specification or the drawings, at least once, a term described together with a different term which is a broader or equivalent term can be replaced with the different term at any point in the specification or the drawings. Also, all combinations of this embodiment and modification examples are included in the scope of the present disclosure. For example, in one embodiment, the present disclosure describes a physical quantity sensor 10 including: a base 20; a movable plate 40 coupled to the base along a pivot axis L2; a first arm 31 connected to the base 20; a second arm 32 or 33 connected to the base 20; and a physical quantity measurement element 60 that has a proximal end attached to the base 20 and a distal end attached to the movable plate 40 and measures a physical quantity caused by stress. Further, the sensor 10 is subdivided into four quadrants by the pivot axis L2 and a bisector L1 orthogonal to the axis L2. The four quadrants include: a first quadrant B11 on a first side (the C2 side) of the axis L2 and a first side (the A2 side) of the bisector L1; a second quadrant B12 on a second side (the C1 side) of the axis L2 and the first side (the A2 side) of the bisector L1; a third quadrant B21 on the first side (the C2 side) of the axis L2 and a second side (the A1 side) of the bisector L1; and a fourth quadrant B22 on the second side (the c1 side) of the axis L2 and the second side (the A1 side) of the bisector L1. The first arm 31 is located in the third quadrant B21 and is fixed within the third quadrant B21 only at a fixed region 31A of the first arm 31 which is less than an entire extent of the first arm 31. The second arm 32 or 33 is located in at least one of the first quadrant B11 and the second quadrant B12 and is fixed within the at least one of the first and second quadrants B11, B12 only at a fixed region 32A or 33A of the second arm 32 or 33 which is less than an entire extent of the second arm 32 or 33. No fixed region is provided in at least one of the second quadrant B12 and the fourth quadrant B22.

What is claimed is:

1. A physical quantity sensor comprising:
   a base;
   a movable plate coupled to the base along a pivot axis;
   a first arm connected to the base;
   at least one second arm connected to the base; and
   a physical quantity measurement element that has a proximal end attached to the base and a distal end attached to the movable plate and measures a physical quantity caused by stress, wherein
   the sensor is subdivided into four quadrants by the pivot axis and a bisector orthogonal to the axis, the four quadrants including:
   a first quadrant on a first side of the axis and a first side of the bisector;
   a second quadrant on a second side of the axis and the first side of the bisector;
   a third quadrant on the first side of the axis and a second side of the bisector; and
   a fourth quadrant on the second side of the axis and the second side of the bisector,
   the first arm is located in the third quadrant and is fixed within the third quadrant only at a fixed region of the first arm which is less than an entire extent of the first arm,
   the at least one second arm is located in at least one of the first quadrant and the second quadrant and is fixed within the at least one of the first and second quadrants only at a fixed region of the second arm which is less than an entire extent of the second arm, and
   no fixed region is provided in at least the fourth quadrant.

2. The physical quantity sensor according to claim 1, wherein
   the fixed region of the at least one second arm is fixed within the second quadrant.

3. The physical quantity sensor according to claim 1, wherein
   the fixed region of the at least one second arm is fixed within the first quadrant.

4. The physical quantity sensor according to claim 1, wherein
   the at least one second arm includes one second arm having the fixed region fixed within the second quadrant and another second arm having the fixed region within the first quadrant.

5. The physical quantity sensor according to claim 1, further comprising:
   a third arm connected to the base, wherein
   the third arm is provided with a protrusion on a surface facing opposite to a surface to which the physical quantity measurement element is attached in at least one of the first to fourth quadrants where no fixed region is provided.

6. The physical quantity sensor according to claim 1, wherein
   each fixed region includes a groove filled with an adhesive.

7. The physical quantity sensor according to claim 1, wherein
   the base and the movable portion are coupled via a living hinge.

8. The physical quantity sensor according to claim 1, further comprising:
   a device base to which the fixed regions are attached.

9. The physical quantity sensor device according to claim 8, wherein
   the physical quantity is acceleration.

10. An inclinometer comprising:
the physical quantity sensor device according to claim 9; and
a calculator that calculates an inclination angle of a structure based on an output signal from the physical quantity sensor device attached to the structure.

11. A structure monitoring device comprising:
the physical quantity sensor device according to claim 9;
a receiver that receives a measurement signal from the physical quantity sensor device attached to a structure; and
a calculator that calculates an inclination angle of the structure based on a signal output from the receiver.

12. A physical quantity sensor device comprising:
a circuit board; and
the three physical quantity sensors mounted on the circuit board so that each measurement axis of the three physical quantity sensors is aligned with each of three orthogonal axes,
wherein each of the three physical quantity sensors includes:
a base;
a movable plate coupled to the base along a pivot axis;
a first arm connected to the base;
at least one second arm connected to the base; and
a physical quantity measurement element that has a proximal end attached to the base and a distal end attached to the movable plate and measures a physical quantity caused by stress, wherein
the sensor is subdivided into four quadrants by the pivot axis and a bisector orthogonal to the axis, the four quadrants including:
a first quadrant on a first side of the axis and a first side of the bisector;
a second quadrant on a second side of the axis and the first side of the bisector;
a third quadrant on the first side of the axis and a second side of the bisector; and
a fourth quadrant on the second side of the axis and the second side of the bisector,
the first arm is located in the third quadrant and is fixed within the third quadrant only at a fixed region of the first arm which is less than an entire extent of the first arm,
the at least one second arm is located in at least one of the first quadrant and the second quadrant and is fixed within the at least one of the first and second quadrants only at a fixed region of the second arm which is less than an entire extent of the second arm,
no fixed region is provided in at least the fourth quadrant, and
a device base is provided to which the fixed regions are attached.

13. A physical quantity sensor device comprising:
device base;
a peripheral wall upstanding from the base;
a step transitioning from the base to the wall;
a physical quantity sensor fixed to the step only at select discrete fixed regions, the sensor including:
a base elongated in a first direction;
an oscillatable plate pivotally coupled to the base by a living hinge longitudinally extending in the first direction;
a first arm connected to the base independently of the plate;
at least one second arm connected to the base independently of the plate; and
a physical quantity measurement element having a proximal end attached to the base and a distal end attached to the plate so as to span the living hinge in a second direction orthogonal to the first direction, wherein
the sensor is subdivided into four quadrants by a pivot axis of the living hinge and a longitudinal axis of the physical quantity measurement element, the four quadrants including:
a first quadrant on a first side of the pivot axis and a first side of the longitudinal axis;
a second quadrant on a second side of the pivot axis and the first side of the longitudinal axis;
a third quadrant on the first side of the pivot axis and a second side of the longitudinal axis; and
a fourth quadrant on the second side of the pivot axis and the second side of the longitudinal axis,
the first arm having a proximal end at the base and extending into the third quadrant, the first arm including a first one of the discrete fixed regions fixed to the step within the third quadrant, the first one of the discrete fixed regions being less than an entire extent of the first arm,
the at least one second arm having a proximal end at the base and extending into at least one of the first quadrant and the second quadrant, the second arm including a second one of the discrete fixed regions fixed to the step within the at least one of the first and second quadrants, the second one of the discrete fixed regions being less than an entire extent of the second arm, and
none of the fixed regions is provided in at least the fourth quadrant.

14. The physical quantity sensor according to claim 13, wherein
the second one of the discrete fixed regions is fixed to the step within the second quadrant.

15. The physical quantity sensor according to claim 13, wherein
the second one of the discrete fixed regions is fixed to the step within the first quadrant.

16. The physical quantity sensor according to claim 13, wherein
the at least one second arm includes one second arm having the second one of the discrete fixed regions to the step within the second quadrant, and another second arm having the second one of the discrete fixed regions fixed to the step within the first quadrant.

17. The physical quantity sensor according to claim 13, further comprising:
a third arm that extends from a proximal end at the base and includes a protrusion abutting against the step within at least one of the first, second, and fourth quadrants where none of the discrete fixed regions is provided.

18. The physical quantity sensor according to claim 13, further comprising:
a third arm that has a proximal end at the base and extends into the second quadrant, the third arm including a third one of the discrete fixed regions fixed to the step within the second quadrant, the third one of the discrete fixed regions being less than an entire extent of the third arm, wherein
the second one of the discrete fixed regions is fixed to the step within the first quadrant, and
none of the fixed regions is provided in the fourth quadrant.

19. The physical quantity sensor according to claim 13, wherein the at least one second arm only includes one second arm, the one second arm having a proximal end at the base and extending into the second quadrant, the one second arm including the second one of the discrete fixed regions fixed to the step within the second quadrant, the second one of the discrete fixed regions being less than an entire extent of the one second arm, and none of the fixed regions is provided in the fourth quadrant.

20. The physical quantity sensor according to claim 13, wherein the at least one second arm only includes one second arm, the one second arm having a proximal end at the base and extending into the first quadrant, the one second arm including the second one of the discrete fixed regions fixed to the step within the at the first quadrant, the second one of the discrete fixed regions being less than an entire extent of the second arm, none of the fixed regions is provided in the second quadrant, and none of the fixed regions is provided in the fourth quadrant.

* * * * *